Figure 1:
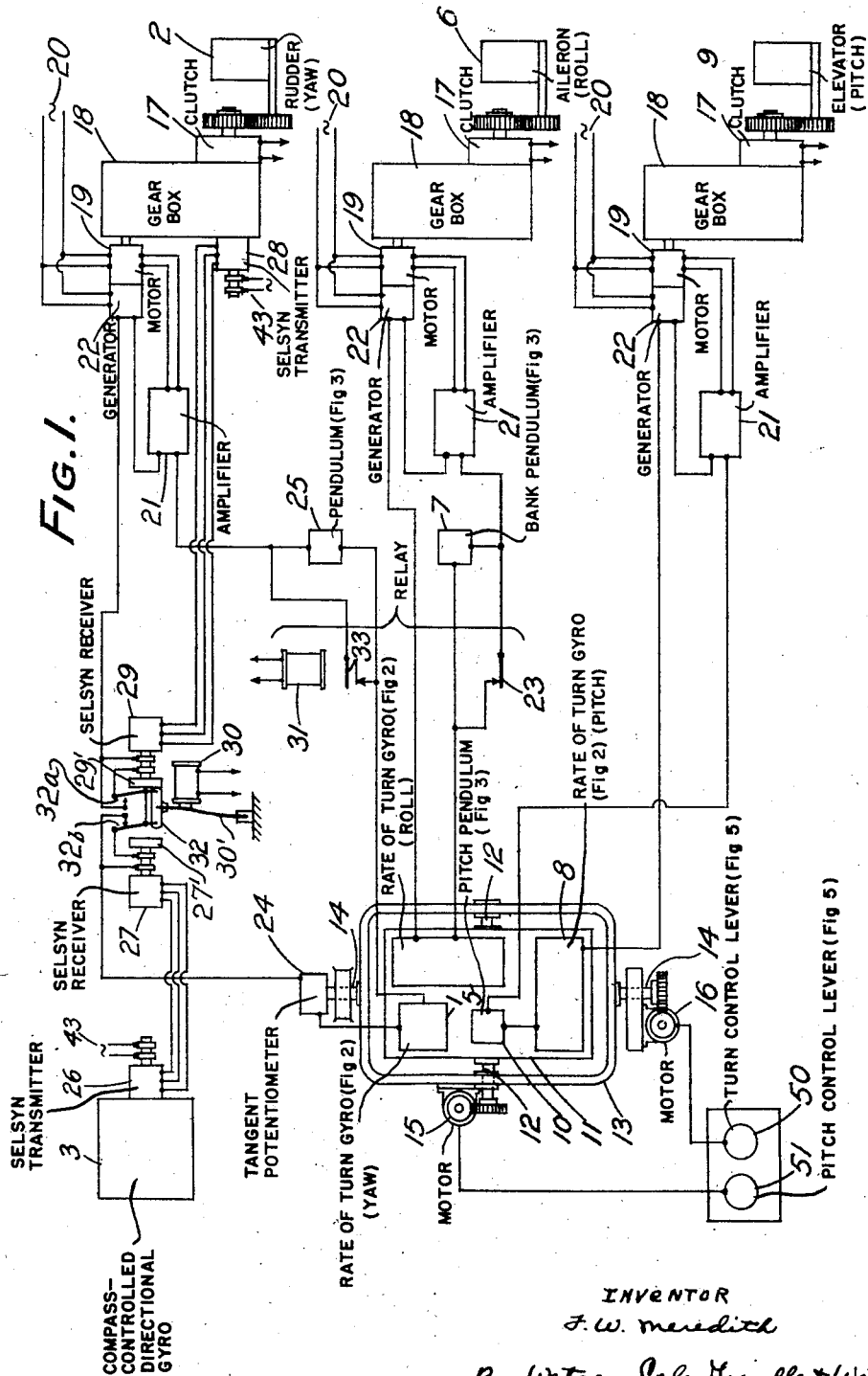

Sept. 23, 1952      F. W. MEREDITH      2,611,559

AUTOMATIC CONTROL SYSTEM

Filed April 1, 1946      3 Sheets-Sheet 1

INVENTOR
F. W. Meredith
By Watson, Cole, Grindle & Watson

Patented Sept. 23, 1952

2,611,559

UNITED STATES PATENT OFFICE 2,611,559

AUTOMATIC CONTROL SYSTEM

Frederick William Meredith, London, England, assignor to S. Smith & Sons (England) Limited, London, England, a British company Application April 1, 1946, Serial No. 658,614
In Great Britain March 9, 1945

7 Claims. (Cl. 244—77)

This invention relates to automatic control systems for maintaining a predetermined condition in which deviation of the condition from a datum value is detected and a servo-motor operated in accordance with the detected deviation to restore the condition to the datum value. In such systems provision is usually made for enabling manual control to be effected and it may be desired that when the automatic control is put in operation the condition which is maintained is that in which it is left by the manual control. Thus in the case of an aircraft it may be desired that the automatic pilot should fly the aircraft automatically on whatever course or in whatever attitude in pitch it may have been placed manually. The object of the present invention is to provide simple and effective means for ensuring that the datum value is that existing when the automatic control is put in operation.

In this specification and appended claims, the term "manual control" means the control of the condition by human means without the assistance of the automatic control system. In the case of the control of an aircraft, the expression means the control of the aircraft by the human pilot by actuation of the control surfaces without the assistance of the automatic pilot and does not mean the control of the aircraft by the human pilot by manipulation of the automatic pilot.

An automatic control system for maintaining a condition at a datum value according to the present invention comprises a device for detecting deviation of the condition from a datum value, a servo-motor controlled by the said device to operate means to restore the condition to the datum value, means for setting the datum value, a switching device for putting the automatic control into and out of operation, and a second servo-motor controlled in accordance with deviations of the condition to operate the datum setting means so that the datum value changes with change of condition, the second servo-motor being rendered operative by operation of the switching device to put the automatic control out of operation whereby the datum is set to the existing condition when the automatic control is next put in operation.

The datum-setting means may comprise the rotor of a receiver of the type known under the trade name "Selsyn," the voltage distribution in the stator of which varies with the condition and the said "Selsyn" receiver or one coupled thereto may comprise the second servo-motor and may function in the manner described in patent application Serial No. 715,707 filed December 12, 1946, now abandoned, so that the voltage induced in the rotor winding when stationary controls the first servo-motor. Such an arrangement is particularly suited for controlling the course of an aircraft, the said rotor being free to rotate during manual control and being fixed during automatic control.

Alternatively, where the condition being controlled is the angular position of a body and the device for detecting deviation is mounted on the body, the second servo-motor may be arranged to rotate the device relatively to the body about the axis of rotation of the body so that the datum value changes with the angular position of the body. Thus an aircraft may be automatically controlled in pitch by signals derived from a pendulum mounted on a platform tiltable in pitch relatively to the aircraft by the second servo-motor so that the platform is stabilised in pitch during manual control.

Figure 2:
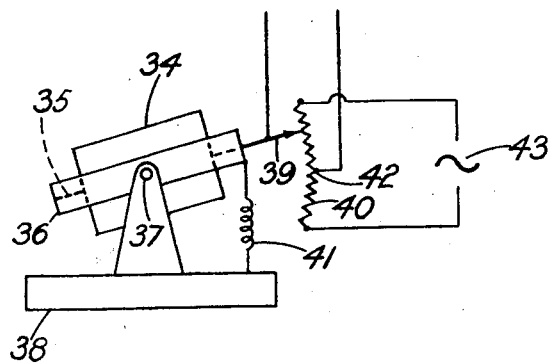
Figure 3:
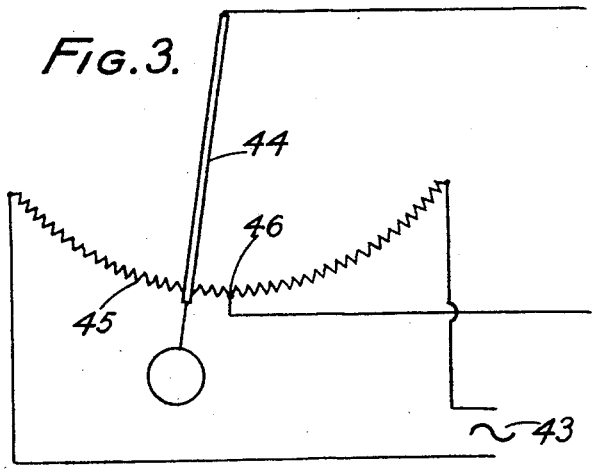
Figure 4:
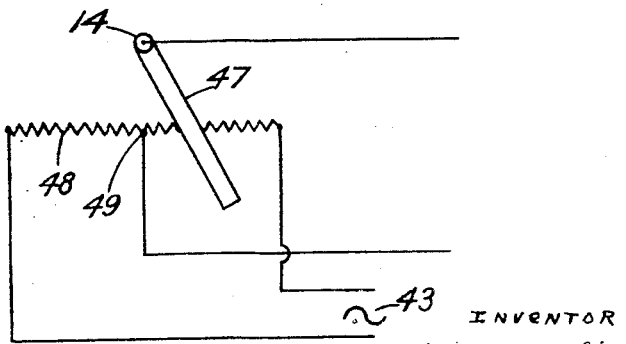
Figure 5:
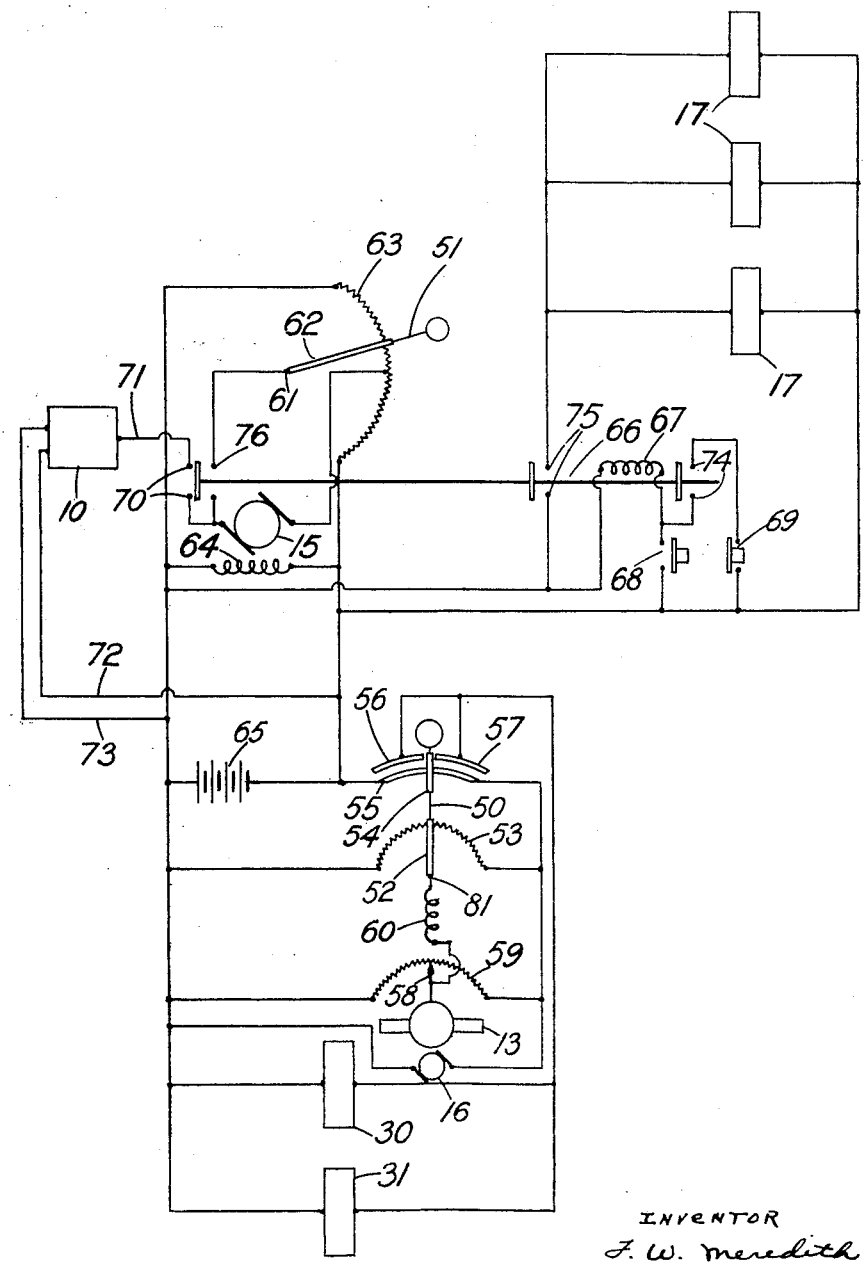

The invention will now be described by way of example with reference to the accompanying drawings in which:

Figure 1 illustrates diagrammatically the layout of an automatic control system for controlling an aircraft about all three axes, Figure 2 illustrates in further detail the rate-of-turn instruments shown in Figure 1, Figure 3 illustrates in further detail the pendulums shown in Figure 1, Figure 4 illustrates in further detail the tangent potentiometer shown in Figure 1, and Figure 5 illustrates in further detail the control circuits shown in Figure 1.

As shown in Figure 1, the aircraft is stabilised about all three axes by means of three rate-of-turn gyroscopes. A rate-of-turn gyroscope 1 controls the rudder 2 to stabilise the aircraft in yaw, a compass-controlled directional gyroscope 3 serving as a course monitor during straight flight. A rate-of-turn gyroscope 5 controls the ailerons 6 to stabilise the aircraft in roll, a bank pendulum 7 serving as a bank monitor. A rate-of-turn gyroscope 8 controls the elevators 9 to stabilise the aircraft in pitch, a pitch pendulum 10 serving as a pitch monitor.

The three rate-of-turn gyroscopes 1, 5 and 8 and the pitch pendulum 10 are mounted on a platform 11 gimballed about the pitch axis 12 in a gimbal ring 13 pivoted in the aircraft about the roll axis 14. The platform 11 can be rotated about the pitch axis 12 relatively to the ring 13 by means of a motor 15 mounted on the ring 13. The ring 13 can be rotated relatively to the aircraft about the roll axis 14 by a motor 16 mounted on the aircraft. The platform 11 can thus be moved to any desired position in pitch or roll relatively to the aircraft by means of the two motors 15 and 16 and during straight flight conditions, the platform is centrally positioned about the roll axis.

Each of the control surfaces, rudder 2, ailerons 6 and elevators 9, is coupled through a clutch 17 and gear box 18 to an electric hysteresis motor 19 of the kind described in British Patents Nos. 576,248 and 576,249. Each motor 19 is wound for two-phase operation, one phase (a reference phase) being coupled to an A. C. source 20, and the other phase, the control phase, being coupled to the output of an amplifier 21. Each motor 19 is coupled to an asynchronous tachometric signal generator 22 of any known kind. Each generator is also wound for two-phase operation, one phase being connected to the source 20 so that an output proportional to the speed of the generator and therefore of the motor is generated in the other phase.

The rate gyroscopes will be described in greater detail hereinafter, and it will suffice for an understanding of Figure 1 to state that a voltage is produced across the output terminals of each rate-of-turn gyroscope which is proportional to the rate-of-turn and is of the same frequency as that of the source 20 but is in quadrature therewith lagging or leading according as the turn is in one direction or the other. The pendulums and their electric circuits will also be described in greater detail hereinafter and it will suffice for an understanding of Figure 1 to state that a voltage is produced across their electrical output terminals proportional to the deviation of the pendulum from its central position and is of the same frequency as that of the source 20 but is in quadrature therewith lagging or leading according as the deviation is in one direction or the other. With this preliminary explanation the operation of the individual control surfaces will now be more fully considered.

Considering first the operation of the elevator control it will be seen that the sum of three voltages is applied to the input of the amplifier 21 of the elevator control. These voltages are proportional respectively to the rate of pitch of the aircraft as measured by the rate-of-turn gyroscope 8, the deviation in pitch of the platform 11 from the apparent horizontal as measured by the pitch pendulum 10 and the speed of the motor 19. The pendulum 10 is purely a monitor, that is it gives a comparatively weak signal compared with those derived from the rate-of-turn gyroscope 8 and the generator 22, and its effect on the operation of the motor 19 during a disturbance may be neglected. Addition of the voltages is effected by connecting the output of the devices 8, 10, 22 in series. The motor 19 drives the generator 22 which generates a voltage opposing the voltage derived from the device 8. The motor 19 thus operates to reduce the input to the amplifier and since the gain of the amplifier is made very large it will reduce this input substantially to nothing. That is to say during a disturbance the motor will run at such a speed that the output of the generator 22 is substantially equal but opposite to the output of the rate-of-turn device 8, or in other words the motor 19 and therefore the elevators 9 will be operated at a speed proportional to the rate of pitch. This will have the effect of very rapidly stabilising any disturbance in pitch. If after the disturbance is stabilised the platform 11 is not level in pitch, the electrical signal from the pitch pendulum 10 will unbalance the system until the platform 11 is level.

The operation of the aileron control will first be considered under straight flight conditions. As will be explained hereinafter, under straight flight conditions a pair of contacts 23, shown as short-circuiting the bank pendulum 7, is open. It will thus be seen that the control of the ailerons 6 is similar to that of the elevators, the aircraft being stabilised in roll by operating the ailerons at a speed proportional to the rate of roll as measured by the rate-of-turn gyroscope 5, and the aircraft being monitored to a level position after any disturbance by signals from the bank pendulum 7. In this case of aileron control, however, the pendulum 7 is mounted on the aircraft and not on the platform 11.

Before considering the operation of the rudder control circuit it is necessary to say a word about the components in this circuit. As in the other circuits there is a rate-of-turn gyroscope 1 measuring rate of yaw. Mounted on the axis 14 is a tangent potentiometer 24. This will be described in greater detail hereinafter and it will suffice for an understanding of Figure 1 to state that a voltage appears across the output terminals of the potentiometer 24 which is proportional to the tangent of the angle through which the platform 11 is turned in roll from its normal central position by the motor 16 and is of the same frequency as that of the source 20 but in quadrature therewith lagging or leading according as the turn is in one direction or the other. A pendulum 25 in all respects similar to the pendulum 7 is provided to detect side slip. A signal proportional to the deviation in yaw is obtained from the directional gyroscope 3 by means of an electric induction transmitter 26 and receiver 27 of the type known under the trade name "Selsyn." The rotor winding of the transmitter 26 is supplied with single-phase A. C. from a source 43 in quadrature with but of the same frequency as the source 20 and said rotor is rotated by the directional gyroscope 3. If the rotor winding of the receiver 27 is short-circuited, it will follow the movements of the transmitter rotor, and if at any instant the receiver is fixed and the short circuit removed from its winding a voltage will appear across this winding proportional to the deviations of the transmitter rotor and therefore of the directional gyroscope 3 relatively to the craft from the positions they occupied at the instant in question. In a similar manner signals proportional to the deviations of the rudder are obtained by means of a transmitter 28 and receiver 29. As before, short-circuiting of the rotor winding of the receiver 29 causes it to follow the movements of the rotor of transmitter 28 and therefore of the rudder, and fixing of the rotor of receiver 29 and the removal of the short circuit causes a voltage to appear across the rotor winding of the receiver 29 proportional to the deviations of the rudder from the position it occupied at the instant when that rotor was fixed.

The operation of the rudder 2 will first be considered under straight flight conditions. Under these conditions a pair of relays 30 and 31, shown in Figure 1 in their energised positions, are de-energised. When the relay 30 is de-energised a brake member 32 moves to the left under the influence of its spring mounting 30' in the drawing releasing the rotor 29' of receiver 29 and fixing the rotor 27' of receiver 27. At the same time the rotor winding of receiver 29 is short-circuited by the closing of switch 32a and that of receiver 27 put into circuit by the opening of switch 32b. The rotor of receiver 29 thus proceeds to follow the rudder movements as explained above so that its winding is maintained in a position of zero output. Meanwhile a voltage appears across the rotor winding of receiver 27 which is proportional to the deviations in yaw of the aircraft from the course it was on at the instant the relay 30 was de-energized. When the relay 31 is de-energised the previously-mentioned contacts 23 are opened and a pair of contacts 33 closed to short circuit the electrical output of the pendulum 25. Thus the only signals appearing in the rudder control circuit are a signal from the rate-of-turn gyroscope 1 proportional to rate of yaw, a signal proportional to deviation from course, and a signal from the generator 22 proportional to rudder speed. The aeroplane is thus stabilised against disturbances in yaw and is monitored to the correct course in a manner which will be obvious from the description already given of the elevator and aileron controls.

Change of course is effected by banked turns. To achieve this the gimbal ring 13 is rotated by the motor 16 and thereby the relays 30 and 31 are operated. The aircraft is thus rotated in roll at the same rate as but in the opposite direction to the gimbal ring 13 to maintain the platform 11 horizontal. When the aircraft has rotated through the desired angle of bank the motor 16 is stopped. Any disturbance of the pendulum 7 during the turn cannot affect the aileron control as the output of this pendulum is now short-circuited by closing of the contacts 23.

Rotation of the gimbal ring 13 will produce a signal from the tangent potentiometer 24 proportional to the tangent of the angle of bank of the aircraft. As is well known, for a correctly banked turn the rate of turn is directly proportional to the tangent of the angle of bank and inversely proportional to the air speed. The constant of proportionality of the tangent potentiometer 24 is selected to give a signal equal but opposite to that given by the rate-of-turn instrument 1 when the aircraft is turning at the correct rate and travelling at its cruising speed. In operation the aircraft will turn so as to maintain these two signals equal and will therefore turn at the speed set by the tangent potentiometer 24. Energisation of the relay 30 releases the rotor of the receiver 27 and at the same time short-circuits its winding. The rotor thus follows the movements of the directional gyroscope 3 during the turn. Energisation of relay 31 opens contacts 33 and puts the pendulum 25 in circuit to detect side slip. If the aircraft is turning at the correct speed there will be no signal from the pendulum 25. On the other hand if the aircraft is not turning at the correct speed, for example due to the air speed differing from the cruising speed, then side slip will take place and the pendulum 25 will give a signal to increase or decrease the rate of turn accordingly. The signal from the pendulum 25 detracts from the inherent damping of the system, and it is therefore necessary to introduce damping by supplying a signal proportional to rudder displacement. This is obtained from the rotor winding of the receiver 29 which is now in circuit, with its rotor held by the member 32.

When the aircraft has turned on to the new course the gimbal ring 13 is returned to its original position and the relays 30 and 31 de-energized. The bank is thus taken off and further turning stopped. The course is now monitored by the signal from the receiver 27 which will be zero when the aircraft is on the new course since the rotor has been following the directional gyroscope during the turn.

The attitude of the aircraft in pitch can be varied by rotating the platform 11 in pitch by means of the motor 15. As will be obvious from the description already given the aircraft will turn in pitch to maintain the platform 11 level.

A suitable rate-of-turn gyroscope for use as gyroscope 1, 5 or 8 is illustrated diagrammatically in Figure 2. As there shown a gyroscope comprises a rotor 34 mounted on spin axis 35 in a gimbal ring 36 gimballed about an axis 37 on a fixed base 38. Carried by the gimbal ring 36 is a potentiometer contact 39 arranged to sweep across a fixed arcuate potentiometer resistance 40 as the ring rotates relatively to the base about the axis 37. The ring 36 is restrained by a spring 41 to a central position in which the contact 39 engages the mid point 42 of the resistance 40. The resistance 40 is connected across the A. C. source 43. The electrical output of the gyroscope appears between the contact 39 and the mid point 42 and is in phase with or in anti-phase with source 43 in accordance with the direction of the displacement of contact 39 from the mid point.

In operation any turn about an axis normal to the base 38 results in precession of the gyroscope about the axis 37 against the spring restraint to an extent determined by the rate of turn. Hence the output voltage will be proportional to the rate of turn. Since source 43 is in quadrature with source 20, this voltage will be in quadrature with source 20, either lagging or leading as the displacement of the gyro and hence the rate of turn is in one direction or the other.

It will be appreciated that the rate-of-turn gyroscope described above may be arranged to measure the rate-of-turn about any of the three aircraft axes and that the three gyroscopes may readily be made interchangeable.

A pendulum suitable for use as pendulum 7, 10 or 25 is illustrated diagrammatically in Figure 3. As there shown a pendulum 44 of suitable conducting material is pivoted to swing about an axis parallel to the roll axis in the case of pendulums 7 and 25 and parallel to the pitch axis in the case of pendulum 10. The pendulum 44 sweeps across an arcuate resistance 45 connected to the A. C. source 43, so that the electrical output appears between the pendulum 44 and the mid point 46 of the resistance 45.

The tangent potentiometer 24 is illustrated diagrammatically in Figure 4. As there shown, an arm 47 of conducting material is attached to the axis 14 so as to rotate with the gimbal ring 13 and sweeps over a linear resistance 48 connected across the A. C. source 43. The output appearing between the arm 47 and the mid point 49 of the resistance is thus proportional to the tangent of the angle through which the gimbal ring 13 is turned.

In the arrangement shown in Figure 1 control is effected by means of a turn control lever 50 and a pitch control lever 51, the lever 50 being rotated in roll to right or left to effect turns to right or left and the lever 51 being rotated in pitch forwards or backwards to move the nose of the aircraft up or down. These two levers may conveniently be combined in the form of a miniature joy stick, but their operation will be more readily understood by considering them as two separate levers. Their operation will be clear from a consideration of Figure 5. As there shown the lever 50 is pivoted at 81 and carries a contact strip 52 insulated from the lever 50 and sweeping over an arcuate potentiometer resistance 53 and a contact strip 54 also insulated from the lever 50 and in permanent engagement with a contact segment 55 and adapted to engage either a contact segment 56 or a contact segment 57 according as the lever is moved in one direction or the other from its central position. The motor 16 rotates through gearing the gimbal ring 13 which drives a contact arm 58 over a potentiometer resistance 59. The motor 16 is a D. C. motor and has a field winding 60 connected between the contact strip 52 and the contact arm 58.

The lever 51 is pivoted at 61 and carries a contact strip 62 sweeping over an arcuate potentiometer resistance 63. The motor 15 which rotates the platform 11 is a D. C. motor with a field winding 64 permanently connected across a battery 65 which supplies the energy for the control circuit. A change-over switch 66 is provided for putting the automatic control into and out of operation. This switch has an operating coil 67 controlled by push buttons 68 and 69 for energising and de-energising the switch respectively. The switch is shown in the de-energised position, that is in the manual control position. In this position one brush of the motor 15 is connected to the pendulum 10 through contacts 70 and lead 71. The lead 71 is connected to a contact on the pendulum arm which is adapted upon displacement from its central position in one direction or the other to engage one or other of two segments connected respectively by leads 72 and 73 to the two terminals of the battery 65. The contact and segments are not shown in Figure 5 but the manner of providing them will be obvious. The other brush of the motor 15 is permanently connected to the mid point of the resistance 63. Hence any displacement of the pendulum causes the motor to run in one direction or the other. The motor runs to rotate the platform 11 to restore the pendulum displacement. Hence during manual control the platform will follow the movements of the pendulum 10. Consequently when the automatic control is put in operation it will continue to fly the aircraft in the same attitude in pitch.

To put the automatic control in operation push button 68 is pressed. This completes a circuit for the coil 67. When the switch operates, this circuit is completed through contacts 74 and the release push button 69. The automatic control can thus be instantly cut out of operation by pressing the push button 69. For convenience of operation this push button may be mounted on top of the miniature joy stick already mentioned.

When the switch 66 operates, a pair of contacts 75 operate the three clutches 17 and so put the automatic control in operation. At the same time the contacts 70 are opened and contacts 76 closed. The motor 15 is thus disconnected from the pendulum 10 and connected between the mid point of the resistance 63 and the contact strip 62 on the lever 51. Consequently when the lever 51 is in its central position (it is only shown displaced to enable the connections to be clearly seen) the motor armature is short-circuited and the motor is stationary. Movement of the lever 51 in one direction or the other will cause the motor to operate in one direction or the other at a speed proportional to the displacement. Hence the aircraft can be made to change its attitude in pitch at any desired rate while under automatic control.

During straight flight under automatic control the lever 50 is in its central position and the relays 30 and 31 de-energized. To change course, the lever 50 is rotated in one direction or the other. As soon as the contact strip 54 engages the segment 56 or 57 the relays 30 and 31 operate. It will be seen that the resistances 53 and 59 form the arms of a Wheatstone bridge of which the field winding 60 forms one diagonal. Displacement of the lever 50 unbalances the bridge and excites the field so that the motor operates to restore the balance. Consequently the motor 16 and therefore the gimbal ring 13 are displaced by the same amount as the lever 50. This determines the angle of bank and therefore the rate-of-turn so that the aircraft can be turned at any desired rate by displacing the lever 50 by the appropriate amount.

I claim:

1. An automatic system for controlling the course of an aircraft having a rudder for control in yaw, said system comprising a rate of turn device, a servo-motor for operating said rudder, means for controlling said servo-motor so as to operate the rudder in accordance with the rate of turn measured by said device, to maintain the aircraft on a datum course, a heading direction sensitive device, a Selsyn receiver the voltage distribution in the stator windings of which varies with variations of the heading of the aircraft, means for controlling said servo-motor in accordance also with the voltage induced in the rotor winding of said receiver, means for locking the rotor and means for short-circuiting the rotor, said locking and short-circuiting means being respectively operated to lock the rotor and remove the short circuit from the rotor when the aircraft is to be maintained on the datum course determined by the position of the rotor and to unlock the rotor and apply the short circuit when the aircraft is to be manually controlled.

2. An automatic control system for aircraft having a rudder for control in yaw and ailerons for control in roll, said system comprising a rate-of-yaw device and a rate-of-roll device mounted on a platform pivoted on the aircraft about the roll axis and tiltable at will about said roll axis, means for controlling the ailerons from said rate-of-roll device to stabilize the aircraft in roll, a servo-motor operating the rudder and controlled in accordance with the rate-of-yaw detected by said rate-of-yaw device to stabilize the aircraft in yaw, a tangent potentiometer operated by the banking movement of the platform and producing a signal proportional to the tangent of the angle of bank of the platform, means for controlling said servo-motor in accordance also with said signal to effect a change of course, a heading direction sensitive device, a Selsyn receiver, the voltage distribution in the stator windings of which varies with variations of the heading of the aircraft, means for controlling said servo-motor in accordance also with the voltage induced in the rotor windings of said receiver, means for locking the rotor when the aircraft is to be maintained on a datum course determined by the position of said rotor and for short-circuiting the rotor winding and for allowing it to rotate freely and follow variations of the heading of the aircraft when the said platform is tilted in bank to effect a change of course.

3. An automatic control system for aircraft as claimed in claim 2 comprising also a second selsyn transmitter, the rotor of which is moved in accordance with movements of the rudder, a second selsyn receiver the terminals of which are connected to the corresponding terminals of said second transmitter, and means operative during a change of course for applying to said servo-motor through an amplifier the signal induced in the rotor winding of said second receiver.

4. An automatic control system as claimed in claim 3 comprising also a side-slip pendulum pivoted about an axis parallel to the roll axis of the aircraft producing a signal proportional to the lateral acceleration of the aircraft, and means for feeding the side-slip signal to said amplifier to adjust the rudder to compensate for side-slip.

5. An automatic control system for aircraft having a rudder for control in yaw and ailerons for control in roll, said system comprising a rate-of-yaw device and a rate-of-roll device mounted on a platform pivoted on the aircraft about the roll axis and tiltable at will about said roll axis, means for controlling the ailerons from said rate-of-roll device to stabilize the aircraft in roll, a servo-motor operating the rudder and controlled in accordance with the rate-of-yaw detected by said rate-of-yaw device to stabilize the aircraft in yaw, a tangent potentiometer operated by the banking movement of the platform and producing a signal proportional to the tangent of the angle of bank of the platform, means for controlling said servo-motor in accordance also with said signal to effect a change of course, a Selsyn receiver the voltage distribution in the stator windings of which varies with variation in the heading of the aircraft, a second Selsyn receiver the voltage distribution in the stator windings of which varies with rudder movements, an amplifier to the input of which are applied the voltages generated in the rotor windings of said receivers, means for controlling said servo-motor in accordance also with the output of said amplifier and means for locking the rotor of the first Selsyn receiver and shorting the rotor winding of the second Selsyn receiver when the aircraft is to be maintained on a datum course determined by the setting of the rotor of the first receiver and for locking the rotor of the second Selsyn receiver and shorting the rotor windings of the first Selsyn receiver when a change of course is being effected.

6. An automatic control system for maintaining a condition at a datum value comprising a device for detecting deviation of the condition from a datum value, a Selsyn transmitter the voltage distribution in whose stator is varied in accordance with variation of the condition, a Selsyn receiver whose stator winding terminals are connected to the corresponding terminals of the transmitter windings, the voltage distribution in the Selsyn receiver stator thereby varying with the condition, a servo-motor operating means for restoring the condition to the datum value and controlled by the voltage generated in the rotor winding of said receiver and means for locking said receiver rotor in the position corresponding to the datum value at which the condition is to be maintained and means for short-circuiting the said rotor and allowing it to rotate freely and follow the variations of the condition when the system is not required to maintain the condition at its datum value, whereby the datum condition is that existing when the lock is applied and the short circuit removed.

7. An automatic control system for controlling the course of an aircraft comprising a device for detecting deviation of the aircraft in yaw from a datum course, a Selsyn transmitter the voltage distribution in whose stator is varied in accordance with variation in the course of the aircraft, a Selsyn receiver whose stator winding terminals are connected to the corresponding terminals of the transmitter windings, the voltage distribution in the Selsyn receiver stator thereby varying with the course of the aircraft, a servo motor operating the rudder of the aircraft and controlled by the voltage generated in the rotor winding of said receiver, and means for locking said receiver rotor in the position corresponding to the datum value at which the condition is to be maintained and means for short-circuiting the said rotor and allowing it to rotate freely and follow the variations in the course of the aircraft when the system is not required to maintain the aircraft on a datum course, whereby the datum course is that upon which the aircraft is flying when the lock is next applied and the short circuit removed.

FREDERICK WILLIAM MEREDITH.

REFERENCES CITED

The following references are of record in the file of this patent:

UNITED STATES PATENTS

| Number | Name | Date |
|---|---|---|
| 2,005,530 | Boykow | June 18, 1935 |
| 2,286,561 | Meredith | June 16, 1942 |
| 2,307,941 | Meredith | Jan. 12, 1943 |
| 2,415,429 | Kellogg et al. | Feb. 11, 1947 |
| 2,429,642 | Newton | Oct. 28, 1947 |
| 2,464,629 | Young | Mar. 15, 1949 |